(12) United States Patent
Song et al.

(10) Patent No.: US 8,625,218 B1
(45) Date of Patent: Jan. 7, 2014

(54) ACQ IN THE PRESENCE OF BASELINE POP

(71) Applicant: Marvell International Ltd., Hamilton (BM)

(72) Inventors: Hongxin Song, Sunnyvale, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/718,404

(22) Filed: Dec. 18, 2012

Related U.S. Application Data

(60) Provisional application No. 61/579,592, filed on Dec. 22, 2011.

(51) Int. Cl.
  *G11B 20/10* (2006.01)
(52) U.S. Cl.
  USPC .............................................. 360/39; 702/195

(58) Field of Classification Search
  USPC ......... 360/39, 53; 369/124.01, 124.05, 124.1, 369/124.11, 174; 702/104, 106, 189–195
  See application file for complete search history.

(56) References Cited

U.S. PATENT DOCUMENTS

| | | | |
|---|---|---|---|
| 6,556,933 B1 * | 4/2003 | Sacks et al. | 702/79 |
| 7,116,504 B1 * | 10/2006 | Oberg | 360/39 |
| 2013/0024163 A1 * | 1/2013 | Xia et al. | 702/191 |

* cited by examiner

*Primary Examiner* — Brenda Bernardi (57) ABSTRACT

Systems and methods for the correction of DC noise in signals read by a head of a disk drive are presented. Circuitry on a first data path may be configured to filter an input signal to remove a DC component. Acquisition parameters on the first data path may be configured based on the filtered signal. Circuitry on a second data path may be configured to adjust the input signal based on the configured acquisition parameters. A mean of a window of data samples of the adjusted input signal may be computed. Based on the computed mean, a correction may be applied to the adjusted input signal until a stopping rule is satisfied.

20 Claims, 5 Drawing Sheets

ACQ IN THE PRESENCE OF BASELINE POP

CROSS-REFERENCE TO RELATED APPLICATION

This patent application claims the benefit under 35 U.S.C. §119(e) of U.S. Provisional Application No. 61/579,592, filed Dec. 22, 2011, which is hereby incorporated by reference herein in its entirety.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

The disclosed technology relates generally to the correction of DC noise in signals read by a head of a disk drive. When a low quality head is used to read data signals on a disk drive, the head is subject to instability events. Such head instability events (HIE) manifest themselves as DC noise, which is also referred to as temporary baseline pop. The severity and frequency of the baseline pop is variable. For example, the baseline pop can last for a length of hundreds to thousands of bits and can result in a DC upshift of up to 50% of the amplitude of the envelope of the signal.

Baseline pop resulting from HIEs can cause distortion in both the preamble and the data portion of the signal being read. For example, baseline pop in the preamble portion impacts the acquisition of timing and gain parameters. Baseline pop in the data portion introduces data errors. Furthermore, HIEs may occur in any portion of the disk being read and their occurrence is difficult to anticipate.

SUMMARY OF THE DISCLOSURE

In accordance with the principles of the present disclosure, methods and apparatus are provided for mitigating the effects of baseline pop resulting from HIEs.

Circuitry on a first datapath may be configured to filter an input signal to remove a DC component. The input signal on the first datapath may be a preamble sequence appended by a sync mark. Acquisition parameters on the first datapath may be configured based on the filtered signal by circuitry on the first datapath. Circuitry on a second datapath may be configured to adjust the input signal based on the configured acquisition parameters.

Circuitry on the first datapath may be configured to collect a window of data samples of the adjusted input signal. A mean of the window of data samples of the adjusted input signal may be computed. Based on the computed mean, a baseline pop correction may be applied to the adjusted input signal until a stopping rule is satisfied. The stopping rule may be satisfied if the sync mark of the input signal is detected. In some embodiments, the stopping rule may be satisfied if a pseudo sync mark of the input signal is detected.

Circuitry on the first datapath may be further configured to subtract the computed mean from the adjusted input signal in order to correct the baseline pop. The circuitry on the second datapath may be further configured to select data samples in the window of data samples to have an identical phase characteristic. The circuitry on the second datapath may compare the computed mean to a threshold and may use the computed mean as an estimate of the baseline pop if the computed mean is above the threshold.

The circuitry on the second datapath may be further configured to adjust a gain and a timing characteristic of the input signal on the second datapath based on the acquisition parameters. Computing the mean may further comprise averaging amplitudes of data samples in the window of data samples. The circuitry on the second datapath may be configured to decode a corrected input signal on the second datapath.

BRIEF DESCRIPTION OF THE FIGURES

The above, and other aspects and advantages of the invention, will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
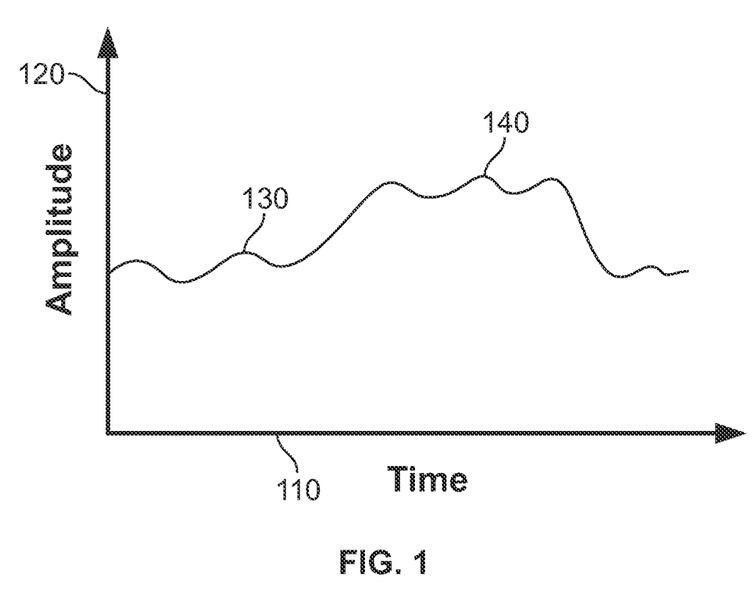
FIG. 1 illustrates an exemplary signal waveform distorted by baseline pop in accordance with an arrangement.

FIG. 1 illustrates an exemplary signal waveform distorted by baseline pop in accordance with an arrangement. The plot shown in FIG. 1 depicts the variation in amplitude over time of the envelope of a signal being read by a head of a disk drive. The signal being read may be either a preamble sequence or data. X-axis 110 of the plot indicates the progression of time and y-axis 120 indicates the amplitude of signal envelope 130.

As illustrated in FIG. 1, the amplitude of signal envelope 130 may change dramatically at time $t_1$, as indicated by signal segment 140. Such a change may be caused by baseline pop or DC noise resulting from an HIE, as discussed above in connection with the background of the disclosure. For example, baseline pop may begin at time $t_1$ and last until time $t_2$. Signal segment 140 indicates the portion of signal envelope 130 between $t_1$ and $t_2$. Signal segment 140 may be different from the portion of signal envelope 130 prior to time $t_1$ and the portion of signal envelope 130 after time $t_2$, with respect to amplitude. For example, the amplitude of signal segment 140 may be higher on average or in the mean than the amplitude of signal envelope prior to time $t_1$.

Figure 2:
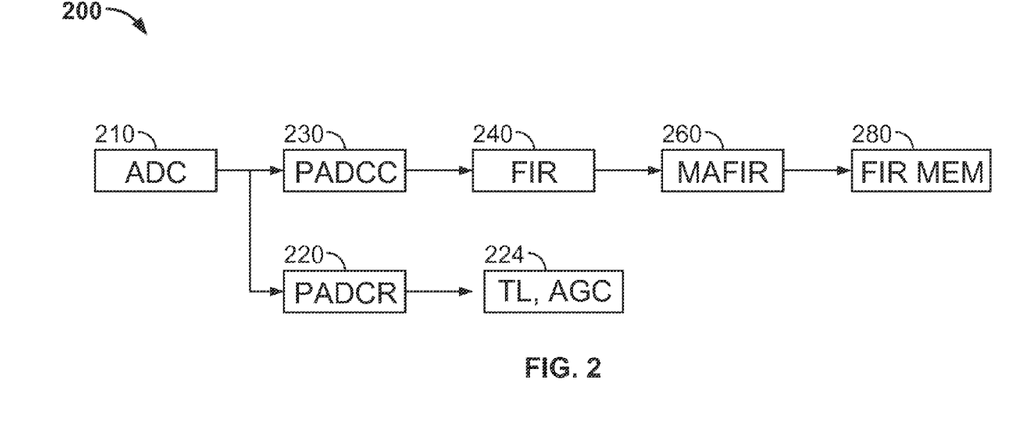
FIG. 2 illustrates an exemplary block diagram for acquiring a signal after correcting baseline pop in accordance with an arrangement.

FIG. 2 illustrates an exemplary block diagram for acquiring a signal after correcting baseline pop in accordance with an arrangement. System 200 includes analog to digital converter (ADC) 210, preamble DC correction (PADCR) circuitry 220, timing loop (TL) and automatic gain control (AGC) circuitry 224, preamble DC rejection (PADCC) circuitry 230, finite impulse response (FIR) filter 240, moving average FIR (MAFIR) circuitry 260, and FIR memory circuitry 280.

In an arrangement, PADCC circuitry 230, FIR filter 240, MAFIR circuitry 260, and FIR memory circuitry 280 may be connected to ADC 210 on a top datapath. PADCR circuitry 220 and TL and AGC circuitry 224 may be connected to ADC 210 on a bottom datapath.

The circuit blocks in system 200 may be preceded by an analog front-end connected to the head of the disk drive (not shown). The analog front-end may receive an analog signal read by the head. ADC 210 may receive the analog signal from the analog front-end and digitize the signal so that it may be processed by the circuit blocks of system 200.

The bottom datapath of system 200 may operate on preamble sequences of the input signal. A preamble sequence may be any predetermined sequence of bits. Preamble sequences may also be periodic, i.e., the predetermined sequence of bits may be repeated. In an implementation, a preamble sequence may be appended by a sync mark. Generally, preamble sequences may precede data portions of the input signal. Circuit blocks on the bottom datapath may be operable to acquire timing and gain control parameters from the preamble sequence. PADCR circuitry 220 may receive a digital signal from ADC 210. The operation of PADCR circuitry 220 is described further in connection with FIG. 4 below.

TL and AGC circuitry 224 may acquire parameters useful for the correct acquisition of the input signal. For example, TL and AGC circuitry 224 may be operable to lock on to a phase and/or a gain of the signal received from PADCR 220. TL and AGC circuitry 224 may be operable to correct the phase and/or the gain of the signal received from PADCR circuitry 220. The phase and/or the gain may be referred to as acquisition parameters.

The top datapath of system 200 may operate on preamble sequences and data portions of the input signal. Unlike preamble sequences, data portions of the input signal are a priori unknown. PADCC circuitry 230 may receive a digital signal from ADC 210. The operation of PADCC circuitry 230 is described further in connection with FIG. 5 below. The remainder of the circuit blocks on the top datapath, FIR filter 240, MAFIR circuitry 260, and FIR memory circuitry 280, may decode the input signal and described further in related U.S. patent application Ser. No. 13/683,638, filed Nov. 21, 2012, which is incorporated by reference herein in its entirety.

Figure 3:
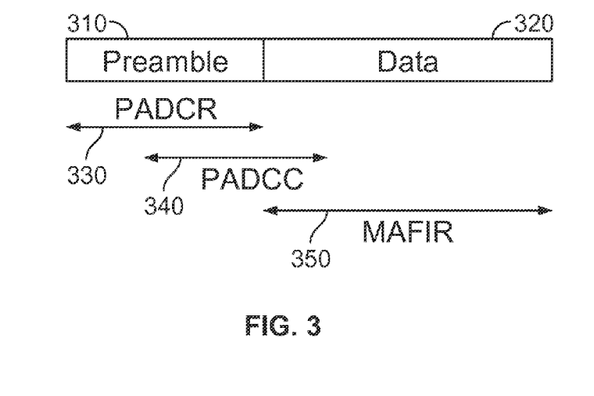
FIG. 3 illustrates exemplary data portions for which various system blocks are active in accordance with an arrangement.

FIG. 3 illustrates exemplary data portions for which various system blocks are active in accordance with an arrangement. The input signal read by the head of the disk drive may contain both preamble sequences and data portions. As an illustration, a preamble sequence 310 may precede a data portion 320 in the input signal. Different circuit blocks of system 200 of FIG. 2 may operate on different portions of the input signal as indicated in FIG. 3. For example, PADCR circuitry 220 may be active during time period 330 when preamble sequence 310 of the input signal is received. PADCC circuitry 230 may be active during time period 340 when preamble sequence 310 and data portion 320 of the input signal are received. PADCC circuitry 230 may be active only for a small segment of data portion 320. MAFIR circuitry 260 may be active during time period 350 when data portion 320 of the input signal is received.

Figure 4:
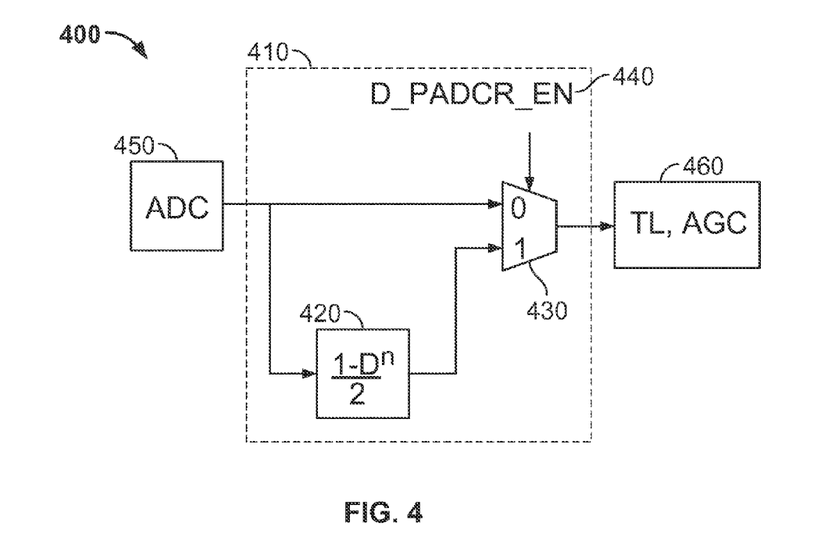
FIG. 4 illustrates exemplary circuitry for rejecting baseline pop in accordance with an arrangement.

FIG. 4 illustrates exemplary circuitry for rejecting baseline pop in accordance with an arrangement. Circuitry 400 includes PADCR circuitry 410, ADC 450, and TL and AGC circuitry 460 which may be substantially similar to PADCR circuitry 220, ADC 210, and TL and AGC circuitry 224, respectively, of FIG. 2. PADCR circuitry 410 includes filter 420 and multiplexer 430.

PADCR circuitry 410 operates on preamble sequences as described in connection with FIG. 3 above. PADCR circuitry 410 may remove the DC component from preamble sequences without modifying the gain or phase of the preamble sequences. PADCR circuitry 410 includes filter 420 for removing the DC component from preamble sequences. Filter 420 may be connected to ADC 450 to receive an input signal corresponding to a preamble sequence. Filter 420 may transmit its output to multiplexer 430.

Filter 420 may be a band-pass filter of the form indicated in FIG. 4. For example, for a general nT preamble sequence, defined by a binary sequence of n consecutive zeros followed by n consecutive ones, an exemplary filter 420 may be specified by $(1-D^n)/2$, where 2n indicates the number of bits in the preamble sequence and T is the time duration of the portion of the signal corresponding to one bit. Filter 420 may reject the DC component of the signal being filtered while introducing no amplitude or phase distortion at the frequency of the preamble sequence. In general, filter 420 may be an n-tap FIR filter with unit gain that does not introduce any amplitude or phase distortion in the preamble sequence. Filter 420 may also be configured to minimize the latency introduced in the preamble sequence by the operation of filter 420.

PADCR circuitry 410 also includes multiplexer 430 connected to filter 420, ADC 450, and TL and AGC circuitry 460. Through multiplexer 430, PADCR circuitry 410 may control whether TL and AGC circuitry 460 receives the output of filter 420 or the unfiltered preamble sequence received from ADC 450. The operation of multiplexer 430 may be controlled by D_PADCR_EN control signal 440. For example, when control signal 440 is low, multiplexer 430 may feed the unfiltered preamble sequence received from ADC 450 through to TL and AGC circuitry 460. When control signal 440 is high, multiplexer 430 may feed the preamble sequence filtered by filter 420 through to TL and AGC circuitry 460. Control signal 440 may be stored in a register. In some embodiments, as a result of the multiplexing by multiplexer 430, the latency of the preamble sequence may increase resulting in a longer preamble sequence.

Circuitry 400 may produce a zero phase start (ZPS) in which the VCO locks on to the phase of the preamble sequence. Returning back to FIG. 2, TL and AGC circuitry 224 may acquire acquisition parameters, e.g., timing and gain parameters, useful for the proper acquisition of the preamble sequence. TL and AGC circuitry 224 may acquire timing and gain parameters from a preamble sequence received from PADCR circuitry 220. The timing and gain parameters acquired by TL and AGC circuitry 224 may be used by circuitry on the top datapath of FIG. 2 for the acquisition of the preamble sequence.

Figure 5:
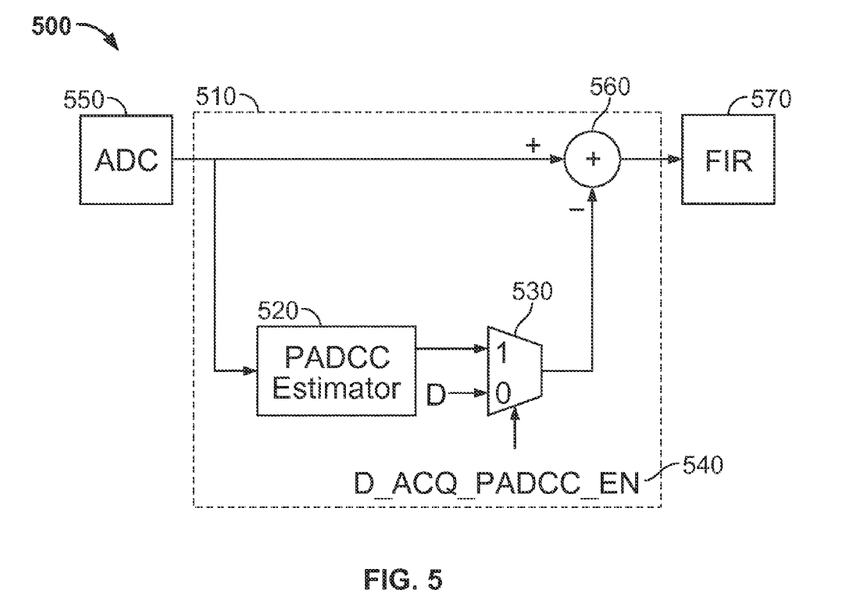
FIG. 5 illustrates exemplary circuitry for correcting baseline pop in accordance with an arrangement.

FIG. 5 illustrates exemplary circuitry for correcting baseline pop in accordance with an arrangement. Circuitry 500 shows PADCC circuitry 230 in greater detail. Circuitry 500 includes PADCC circuitry 510, ADC 550, and FIR 570. PADCC circuitry 510, ADC 550, and FIR 570 may be substantially similar to PADCC circuitry 230, ADC 210, and FIR 240, respectively, of FIG. 2.

PADCC circuitry 510 estimates the amount of baseline pop or DC bias in the input signal received from ADC 550 and corrects the baseline pop of the input signal based on the estimate. In particular, PADCC circuitry 510 removes baseline pop from the preamble sequence based on a sync mark of the preamble sequence. Removing baseline pop from a signal may be referred to as applying a correction to the signal.

PADCC circuitry 510 includes PADCC estimator 520, multiplexer 530, and subtractor 560. PADCC estimator 520 may be connected to ADC 550 and multiplexer 530. PADCC estimator 520 estimates the amount of baseline pop or DC bias in the input signal received from ADC 550. PADCC estimator 520 transmits the estimate to multiplexer 530.

PADCC estimator 520 receives samples of the preamble sequence from ADC 550. Samples received during a particular window may be used to perform the baseline pop estimation. As described above in connection with FIG. 2, preamble sequences may be periodic. Accordingly, the average or mean amplitude of a preamble sequence over one or more periods is zero. When the head of the disk drive is operating normally, no baseline pop is introduced. Therefore, the mean amplitude of the preamble sequence over one or more periods remains zero when the head is operating normally. However, when an HIE occurs, baseline pop, i.e., a DC bias, is introduced. In this case, the mean amplitude of the preamble sequence over one or more periods is no longer zero and instead has a value indicative of the amount of baseline pop. PADCC estimator 520 may rely on this to estimate the baseline pop.

PADCC estimator 520 may select a window of samples of the preamble sequence received from ADC 550 over which to estimate the baseline pop. The window of samples may be selected such that the window does not contain a phase jump, i.e., the phase of the preamble sequence during the selected window remains constant. In particular, if the selected window includes a phase jump, then the assumption that the mean amplitude of the preamble sequence over one or more periods is zero is no longer valid. Generally, the length of the window of samples over which baseline pop is estimated should be maximized for accuracy and reliability based on the following requirements: (1) output samples received from ADC 550 are valid preamble sequence samples, (2) output samples received from ADC 550 have not been subject to adjustment from TL and AGC circuitry, such as TL and AGC circuitry 224 of FIG. 2, and (3) the length of the window of samples should be a multiple of the preamble period, i.e., 2n.

Accordingly, PADCC estimator 520 may select a window of samples corresponding to the ZPS described in connection with FIG. 4 above. The length of the ZPS may be variable. In an exemplary embodiment, the ZPS may be 8, 16, or 32 point, i.e., the number of samples in the ZPS may be 8, 16, or 32.

The baseline pop estimate may be compared against a threshold value to ensure that the baseline pop detected is indeed caused by improper function of the disk drive head. For example, if the baseline pop estimate is a low value then it might simply be caused by noise. Accordingly, PADCC circuitry 510 may rely on the baseline pop estimate provided the baseline pop estimate exceeds a threshold value. Exemplary threshold values may be 0, 2, 4, or 6, although any other suitable value may also be used.

The value of the threshold being used may be stored in a register. If the baseline pop estimate is less than or equal to the threshold value stored in this register, then the baseline pop estimate is set to zero.

PADCC circuitry 510 includes multiplexer 530 connected to PADCC estimator 520 and subtractor 560. Through multiplexer 530, PADCR circuitry 510 may control whether subtractor 560 receives the baseline pop estimate from PADCC estimator 520 or a constant zero value. The operation of multiplexer 530 may be controlled by D_ACQ_PADCC_EN control signal 540. For example, when control signal 540 is low, multiplexer 530 may feed the constant zero value through to subtractor 560. When control signal 540 is high, multiplexer 530 may feed the baseline pop estimate generated by PADCC estimator 520 through to subtractor 560. Control signal 540 may be stored in a register.

PADCC circuitry 510 may begin applying a correction, i.e., correcting the baseline pop, as soon as PADCC estimator 520 generates an estimate of the baseline pop. In particular, the baseline pop may be corrected by subtracting the estimate of the baseline pop generated by PADCC estimator 520 from the output of ADC 550. Subtractor 560 may perform this operation. The duration for which baseline pop correction is applied is based on a stopping rule which is described in connection with FIG. 6 below.

Figure 6:
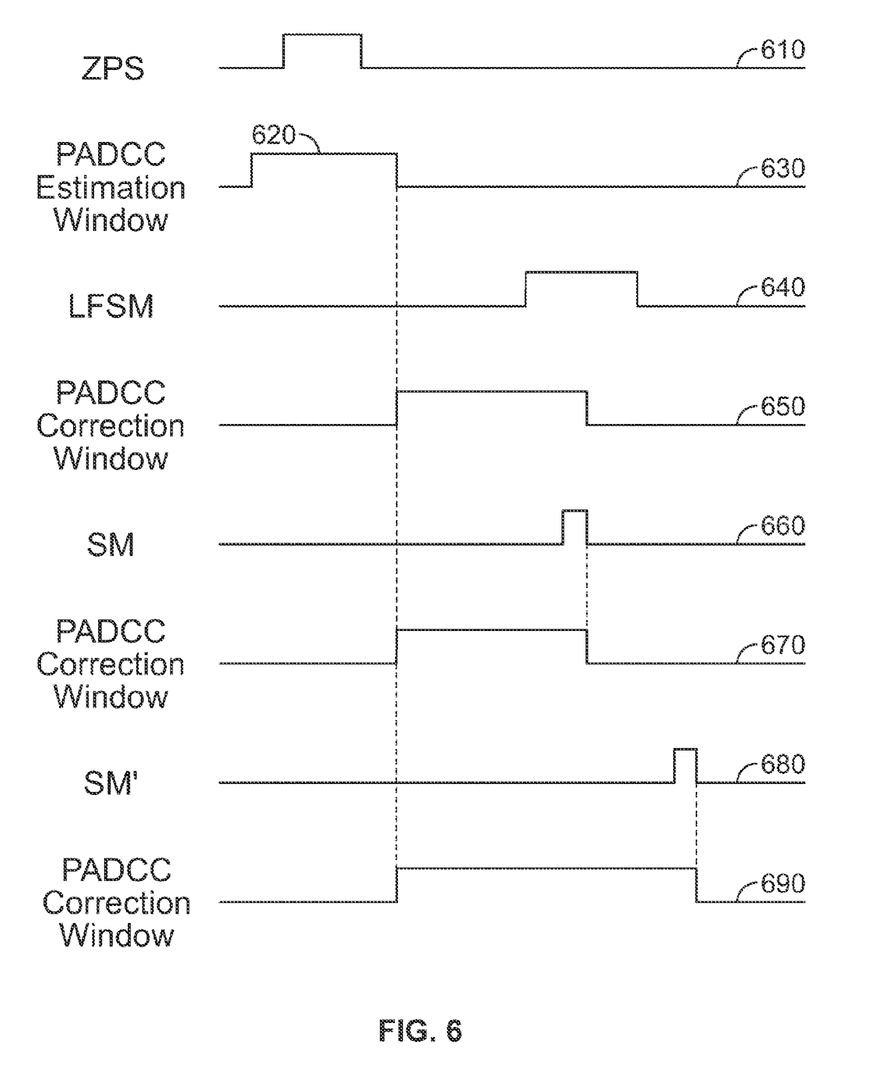
FIG. 6 illustrates exemplary signal waveforms showing windows in which baseline pop correction is applied in accordance with an arrangement.

FIG. 6 illustrates exemplary signal waveforms showing windows in which baseline pop correction is applied in accordance with an arrangement. Waveform 610 shows the ZPS as described in connection with FIG. 5 above. In particular, the portion of waveform 610 with a high value indicates the ZPS. Waveform 620 shows the window of preamble sequence samples used by PADCC estimator 520 of FIG. 5 to estimate the baseline pop. Evident from waveform 620 is that the estimation window begins prior to the start of the ZPS and ends after the end of the ZPS. The portions of the estimation window before and after the ZPS correspond to the extension of the ZPS to the past and future as described in connection with FIG. 5 above.

PADCC estimator 520 completes generating an estimate of the baseline pop by the end of the estimation window. Baseline pop correction is then immediately applied. This is shown in waveforms 650, 670, and 690. Each of waveforms 650, 670, and 690 shows that the baseline pop correction begins as soon as the PADCC estimation window of waveform 620 ends.

The remainder of the waveforms shown in FIG. 6 illustrate when PADCC circuitry 510 terminates the baseline pop correction. In particular, the termination of the baseline pop correction is based on a stopping rule dependent on a sync mark appended to a preamble sequence. A sync mark may be any suitable end-of-signal mark indicating the end of a preamble sequence.

Waveforms 640, 660, and 680 show three different points at which the baseline pop correction may be terminated. Waveform 640 shows a sync mark detected either by a sync mark detector driven by outputs of a Viterbi decoder or by a sync mark detector driven by equalized FIR samples.

Waveform 660 shows the occurrence of a sync mark at the end of a preamble sequence. The sync mark may be detected by PADCC circuitry 510. The falling edge of the sync mark indicates the end of the sync mark. Accordingly, as shown by waveform 670, correction of the baseline pop terminates according to a stopping rule which is satisfied when the falling edge of the sync mark is detected.

In some instances, the sync mark may not be detected. If the sync mark is not detected then the baseline pop correction may not terminate. To avoid this, PADCC circuitry 510 may be configured to end the baseline pop correction according to a stopping rule which is satisfied when a predetermined duration is completed. In particular, after a predetermined duration from the point at which baseline pop correction begins, a pseudo sync mark detection event occurs. Such a pseudo sync mark is shown by waveform 680. The falling edge of the pseudo sync mark may indicate the end of the sync mark. Accordingly, as shown by waveform 690, correction of the baseline pop terminates on the falling edge of the pseudo sync mark.

In some implementations, there may be a latency between the detection of the sync mark and the termination of the correction of baseline pop. This may be referred to as sync mark detection (SMD) latency. A by-product of SMD latency may be that the baseline pop correction may be terminated after the point at which the sync mark actually ends. Thus, baseline pop correction may also be applied to a segment of the data portion following the preamble sequence and the sync mark. This is shown in waveforms 640 and 650.

It is clear from waveforms 650, 670, and 690, that the baseline pop correction ends on or after the falling edge of the sync mark. Thus, the baseline pop correction is also applied to the sync mark appended to the preamble sequence. This is advantageous because it helps ensure that the sync mark is reliably detected by circuit blocks on the top datapath of FIG. 2.

Figure 7:
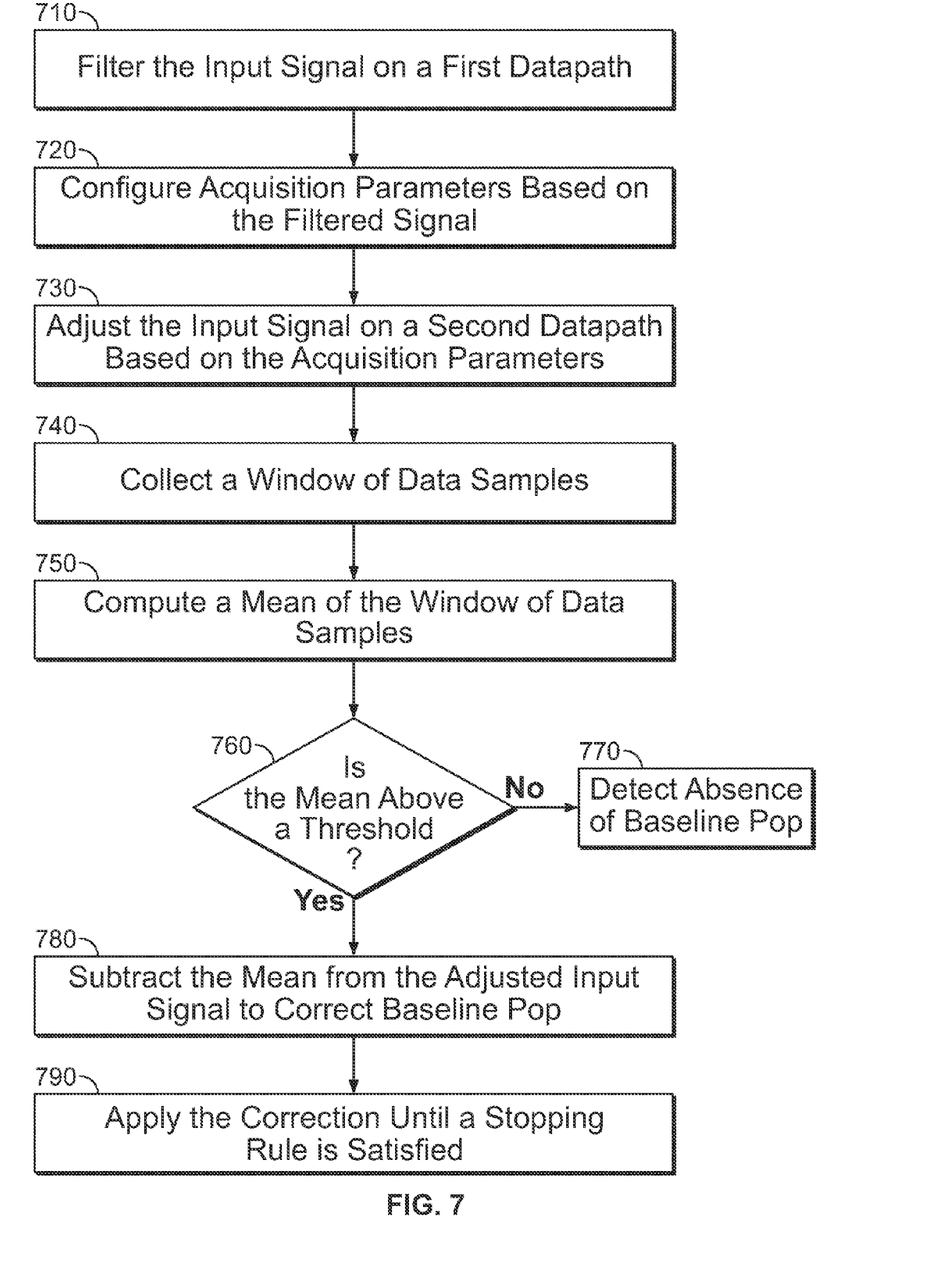
FIG. 7 illustrates an exemplary process for correcting baseline pop in accordance with an arrangement.

FIG. 7 illustrates an exemplary process for correcting baseline pop in accordance with an arrangement. The process of FIG. 7 begins at 710. At 710, the input signal received from ADC 210 of FIG. 2 is processed on a first datapath. The samples of the received signal corresponding to a preamble sequence may be processed in a manner substantially similar to that described in connection with FIGS. 2 and 4 above. In particular, PADCR circuitry 220 of FIG. 2 may process the received samples to reject the DC component using a filter.

At 720, the samples of the preamble sequence processed on the first datapath may be used to configure acquisition parameters. Acquisition parameters, e.g., timing and/or gain parameters, may be configured in a manner substantially similar to that described in connection with FIGS. 2 and 4 above. For example, TL and AGC circuitry 224 of FIG. 2 may determine timing and gain parameters.

At 730, the input signal on a second datapath may be adjusted based on the acquisition parameters configured at 720. For example, the timing and gain parameters determined by TL and AGC circuitry 224 of FIG. 2 may be used to adjust the signal output by ADC 210 of FIG. 2 for improved signal acquisition. The signal output by ADC 210 may correspond to a preamble sequence.

At 740, samples of a preamble sequence may be collected during a window. Samples of the preamble sequence may be collected by PADCC circuitry 230 of FIG. 2 in a manner substantially similar to that described in connection with FIG. 5 above. At 750, a mean amplitude value of the samples collected during the window at 740 may be computed. The mean amplitude may be computed by PADCC circuitry 230 of FIG. 2 in a manner substantially similar to that described in connection with FIG. 5 above. The mean amplitude may serve as an estimate of the amount of baseline pop present in the signal read by a faulty disk drive head.

At 760, a determination may be made as to whether the mean amplitude computed at 750 is above or below a threshold value. The comparison may be made by PADCC circuitry 230 of FIG. 2 in a manner substantially similar to that described in connection with FIG. 5 above. In response to a determination that the mean amplitude is below the threshold, the process proceeds to 770 where the estimate of the baseline pop is set to zero. Otherwise, the process proceeds to 780.

At 780, a correction to the signal output by ADC 210 of FIG. 2 may be applied, i.e., the baseline pop distortion may be corrected. In particular, the estimate of baseline pop computed at 750 may be subtracted from the signal adjusted at 730. Correction of the baseline pop may be performed in a manner substantially similar to that described in connection with FIGS. 5 and 6 above.

At 790, the correction of the baseline pop may continue until a stopping rule is satisfied. The stopping rule may be based on the detection of a sync mark appended to the preamble sequence. The termination of the correction of the baseline pop in accordance with the stopping rule may be performed in a manner substantially similar to that described in connection with FIGS. 5 and 6 above.

The above described implementations are presented for the purposes of illustration and not of limitation. Other embodiments are possible and one or more parts of techniques described above may be performed in a different order (or concurrently) and still achieve desirable results. In addition, techniques of the disclosure may be implemented in hardware, such as on an application specific integrated circuit (ASIC) or on a field-programmable gate array (FPGA). The techniques of the disclosure may also be implemented in software.

What is claimed is:

1. A method for acquiring an input signal distorted by baseline pop, the method comprising:
    filtering the input signal on a first datapath to remove a DC component;
    configuring acquisition parameters based on the filtered signal;
    adjusting the input signal on a second datapath based on the acquisition parameters;
    computing a mean of a window of data samples of the adjusted input signal; and
    applying a correction, based on the mean, to the adjusted input signal until a stopping rule is satisfied.

2. The method of claim 1 further comprising:
    subtracting the mean from the adjusted input signal for the correction of the baseline pop.

3. The method of claim 1 further comprising selecting data samples in the window of data samples to have an identical phase characteristic.

4. The method of claim 1 further comprising:
    comparing the computed mean to a threshold; and
    using the computed mean as an estimate of the baseline pop if the computed mean is above the threshold.

5. The method of claim 1, wherein the stopping rule is satisfied if a sync mark of the input signal is detected.

6. The method of claim 5, wherein the input signal on the first datapath is a preamble sequence appended by the sync mark.

7. The method of claim 1, wherein the stopping rule is satisfied if a pseudo sync mark of the input signal is detected.

8. The method of claim 1 further comprising adjusting a gain and a timing of the input signal on the second datapath based on the acquisition parameters.

9. The method of claim 1, wherein computing the mean further comprises averaging amplitudes of data samples in the window of data samples.

10. The method of claim 1 further comprising decoding a corrected input signal on the second datapath.

11. A system for acquiring an input signal distorted by baseline pop, the system comprising:
    circuitry on a first datapath configured to:
        filter the input signal to remove a DC component; and
        configure acquisition parameters based on the filtered signal; and
    circuitry on a second datapath configured to:
        adjust the input signal based on the acquisition parameters;
        compute a mean of a window of data samples of the adjusted input signal; and
        apply a correction, based on the mean, to the adjusted input signal until a stopping rule is satisfied.

12. The system of claim 11, wherein the circuitry on the first datapath is further configured to:
    subtract the mean from the adjusted input signal for the correction of the baseline pop.

13. The system of claim 11, wherein the circuitry on the second datapath is further configured to select data samples in the window of data samples to have an identical phase characteristic.

14. The system of claim 11, wherein the circuitry on the second datapath is further configured to:
   compare the computed mean to a threshold; and
   use the computed mean as an estimate of the baseline pop if the computed mean is above the threshold.

15. The system of claim 11, wherein the stopping rule is satisfied if a sync mark of the input signal is detected.

16. The system of claim 15, wherein the input signal on the first datapath is a preamble sequence appended by the sync mark.

17. The system of claim 11, wherein the stopping rule is satisfied if a pseudo sync mark of the input signal is detected.

18. The system of claim 11, wherein the circuitry on the second datapath is further configured to adjust a gain and a timing of the input signal on the second datapath based on the acquisition parameters.

19. The system of claim 11, wherein computing the mean further comprises averaging amplitudes of data samples in the window of data samples.

20. The system of claim 11 wherein the circuitry on the second datapath is further configured to decode a corrected input signal on the second datapath.

\* \* \* \* \*